US008595507B2

(12) United States Patent
Panchapakesan et al.

(10) Patent No.: US 8,595,507 B2
(45) Date of Patent: Nov. 26, 2013

(54) CLIENT-BASED AUTHENTICATION (75) Inventors: Santosh Kumar Panchapakesan, Bangalore (IN); Vinayak Hegde, Bangalore (IN)

(73) Assignee: Novell, Inc., Provo, UT (US)

( * ) Notice: Subject to any disclaimer, the term of this patent is extended or adjusted under 35 U.S.C. 154(b) by 155 days.

(21) Appl. No.: 13/028,401

(22) Filed: Feb. 16, 2011

(65) Prior Publication Data
US 2012/0210135 A1 Aug. 16, 2012

(51) Int. Cl.
*G06F 21/00* (2013.01)

(52) U.S. Cl.
USPC ........... 713/184; 713/182; 713/183; 713/185; 726/1; 726/2; 726/22; 726/26; 726/34; 708/135

(58) Field of Classification Search
USPC .................. 713/182–185; 726/1–36; 708/135
See application file for complete search history.

(56) References Cited

U.S. PATENT DOCUMENTS

| | | | |
|---|---|---|---|
| 7,421,503 B1 | 9/2008 | Stieglitz et al. | |
| 7,734,912 B2 | 6/2010 | Ganesan et al. | |
| 2001/0001876 A1* | 5/2001 | Morgan et al. | 713/171 |
| 2002/0071561 A1 | 6/2002 | Kurn et al. | |
| 2007/0101126 A1* | 5/2007 | Choi et al. | 713/156 |
| 2008/0077755 A1* | 3/2008 | Kitaj et al. | 711/154 |
| 2008/0263363 A1 | 10/2008 | Jueneman et al. | |
| 2009/0077379 A1 | 3/2009 | Geyzel et al. | |
| 2009/0300745 A1 | 12/2009 | Dispensa | |
| 2011/0176675 A1* | 7/2011 | Hughes et al. | 380/44 |
| 2012/0201379 A1* | 8/2012 | Fuchs et al. | 380/255 |

OTHER PUBLICATIONS

"Multifactor Authentication for SA Series Users", http://www.juniper.net/us/en/local/pdf/solutionbriefs/3510254-en.pdf, Juniper Networks Solutions Brief, (Mar. 2010), 3 pgs.

* cited by examiner

*Primary Examiner* — Edan Orgad
*Assistant Examiner* — Roderick Tolentino
(74) *Attorney, Agent, or Firm* — Schwegman Lundberg & Woessner, P.A.

(57) ABSTRACT

Apparatus, systems, and methods may operate to invoke multiple authentication mechanisms, by a client node, to encrypt N split-keys using credentials associated with corresponding ones of the authentication mechanisms. Further activity may include transforming the split-keys to provide N encrypted split-keys, and storing each of the encrypted split-keys with an associated local user identity and an identity of corresponding ones of the authentication mechanisms. Additional apparatus, systems, and methods are disclosed.

18 Claims, 4 Drawing Sheets

CLIENT-BASED AUTHENTICATION

BACKGROUND

Today, many computers (e.g., workstations, personal computers, notebook computers, thin clients, tablet computers, etc.) contain sensitive information which users desire to protect. In this regard, an advanced authentication server is sometimes used to provide multi-factor authentication over a network connection to such computers, when they operate as clients. Sometimes however, the server is not available to these clients at the time that authentication is desired.

SUMMARY

In various embodiments, apparatus, systems, and methods that support client-based authentication are provided. In some cases, the activity includes invoking multiple authentication mechanisms, by a client node, to encrypt split-keys using credentials associated with corresponding ones of the authentication mechanisms. Further activity may include transforming the split-keys to provide encrypted split-keys, and storing each of the encrypted split-keys with an associated local user identity and the identity of one or more corresponding authentication mechanisms.

In some cases, the activity includes splitting an original security key to provide N split-keys corresponding to N authentication mechanisms executable on the client node, after which the security key is discarded. Further activity may include invoking the authentication mechanisms to encrypt the N split-keys using credentials associated with the N authentication mechanisms, which results in transforming the split-keys to provide N encrypted split-keys. Additional activity may include decrypting the split-keys using the credentials associated with corresponding ones of the authentication mechanisms so that the security key can be reconstructed as a reconstructed key, and used to replicate network login at the client node. This may occur in response to receiving an indication that network login has been attempted at the client node, and that an authentication node, perhaps taking the form of an authentication server, is not accessible. Additional embodiments are described, and along with the foregoing examples, will be set forth in detail below.

DETAILED DESCRIPTION

To address some of the issues noted above, among others, client-based authentication can be implemented. The embodiments described herein allow a computer user to provide credentials, and a client device to receive them, for any number of authentication mechanisms. In this way, multi-factor authentication can be accomplished without the client connecting to or otherwise communicating with an authentication entity (e.g., enabling authentication without accessing an authentication server, using only the local workstation).

For the purposes of this document, "credentials" are secrets used by a user to authenticate their identity to an entity, such as a server, on a network. These secrets can take the form of what a user knows (e.g., password), what a user has in their possession (e.g., a radio frequency identification (RFID) token, a smartcard, a proximity card), and/or what the user is (e.g., biometric features, including fingerprint, iris, and voice recognition).

When multi-factor authentication is described herein, it will be assumed that a number N of client authentication mechanisms are presented to the user, via one or more user interfaces, to receive at least N mechanism-specific sets of network authentication credentials that are intended to be sent to corresponding authentication mechanisms operating on one or more authentication entities (e.g., servers). To provision the client for this type of operation, even when no network connection to an authentication node is available, a client authentication module (e.g., a pluggable authentication module (PAM), Novell® modular authentication service (NMAS), or simple authentication and security layer (SASL), among others) can be used to generate a random security key K.

The original key K can be split into N split-keys $K_i$, where (where $1 \leq i \leq N$) using Shamir's method, or any other method known to those of ordinary skill in the art. At this point, the client may operate to invoke each authentication mechanism using a corresponding one of the split-keys $K_i$ as a parameter. Each mechanism can be used to encrypt its corresponding split-key $K_i$ with a mechanism-specific credential. The client can then operate to store the encrypted split-keys $K_i$ in a secure storage area, associating each of the split-keys with the appropriate corresponding user name and mechanism name. The secure storage area may take the form of a database having encrypted data, a file with encrypted data maintained by the client, or a registry that is accessed using permissions granted by the system administrator.

Upon successful login to the network, the system user name and password can be encrypted using the key K, and the encrypted results stored in a secure storage area (which may be the same area, or a different area from the area where the encrypted split-keys are stored). These stored results are also associated with the user name, so that later, if network login functionality is not available, the key K can be reconstructed and authentication operations can progress within the client (e.g., without a network connection to the authentication server).

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments that can be realized.

Figure 1:
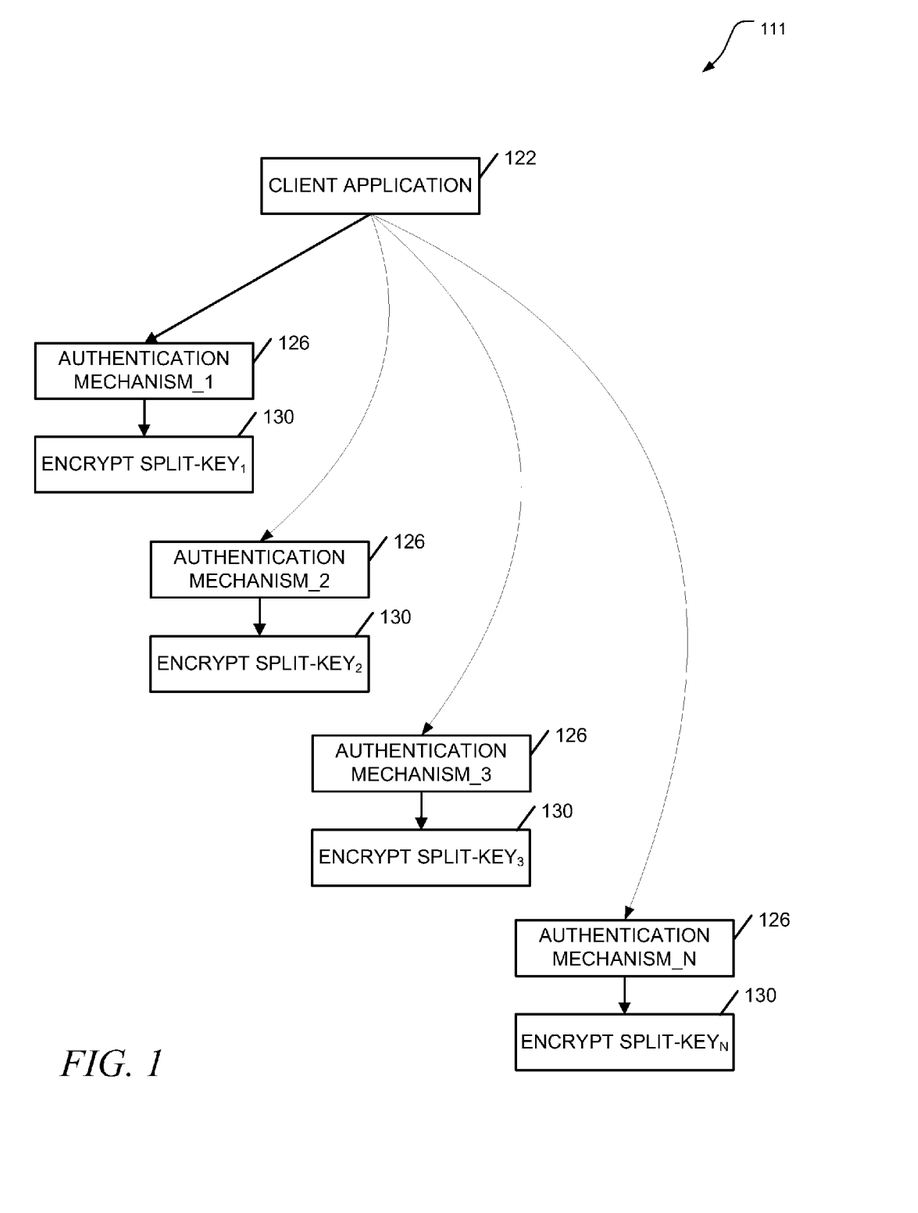
FIG. 1 is a block diagram that illustrates the encryption of split-keys according to various embodiments of the invention.

FIG. 1 is a block diagram 111 that illustrates the encryption of split-keys according to various embodiments of the invention. The methods illustrated by the diagram 111 are implemented in a machine-accessible and readable medium and are operational over processes within and among networks. The networks may be wired, wireless, or a combination of wired and wireless. These methods may be implemented as instructions, which when executed by a specific machine, operate to perform the processing depicted in FIG. 1. Given this context, client-based authentication is now discussed with reference to FIG. 1.

When the user logs into a client, such as a workstation, and the authentication server is not accessible (e.g., the connecting network is down), various embodiments operate to proceed with client-based authentication. In some embodiments, the following activities occur.

Each of the authentication mechanisms (resident on the client, or accessible to the client) operate to locally verify the credentials provided to them. This process begins with decrypting each split-key Ki using the mechanism-specific credentials, which can be successfully accomplished only when the credential(s) corresponding to each mechanism are properly received by the client, and validated. That is, if one or more of the credentials are unknown, or improperly transmitted to the client, then authentication will fail in most embodiments. In some cases, the authentication mechanisms may operate to store metadata to assist in local authentication. This type of operation depends on the rules set up by the system administrator, or other authority.

If the split-keys are successfully decrypted, the client may operate to merge or otherwise combine the split-keys Ki to re-generate the key K (which in many embodiments is discarded by the client shortly after being split). The previously-stored and encrypted system password can then be retrieved from the secure storage area, and the key K can be used to decrypt the system password corresponding to the user name that has been received. At this point, multi-factor authentication is complete, and login to an operational network using network credentials has been accomplished in a way that the end user at the client sees no difference between the replicated login procedure that has just been completed, and the process of actually logging in to an operational network (even though the network connection to the authentication entity may in fact be inoperative). Once the network becomes operational however, the client may operate to facilitate user authentication to the authentication server in some embodiments.

In this way, multi-factor, client-based authentication that replicates network login can be realized, even when the network is not operational, or is otherwise unavailable. The various embodiments thus operate to enhance the security of client login operations, with minimal changes to existing client applications. For example, if all of the authentication mechanisms are based on passwords, the client can itself create the Ki split-keys, and encrypt them using the passwords. In some cases, each of the client authentication mechanisms may store metadata to enable local user authentication.

In some embodiments, the split-keys are encrypted by corresponding random keys, which have themselves been previously encrypted using corresponding ones of the passwords. For this implementation, the authentication mechanism does not necessarily intervene in any part of the local login process when network credentials are used, and the authentication server is not accessible to the client. Thus, many additional embodiments may be realized.

Figure 2:
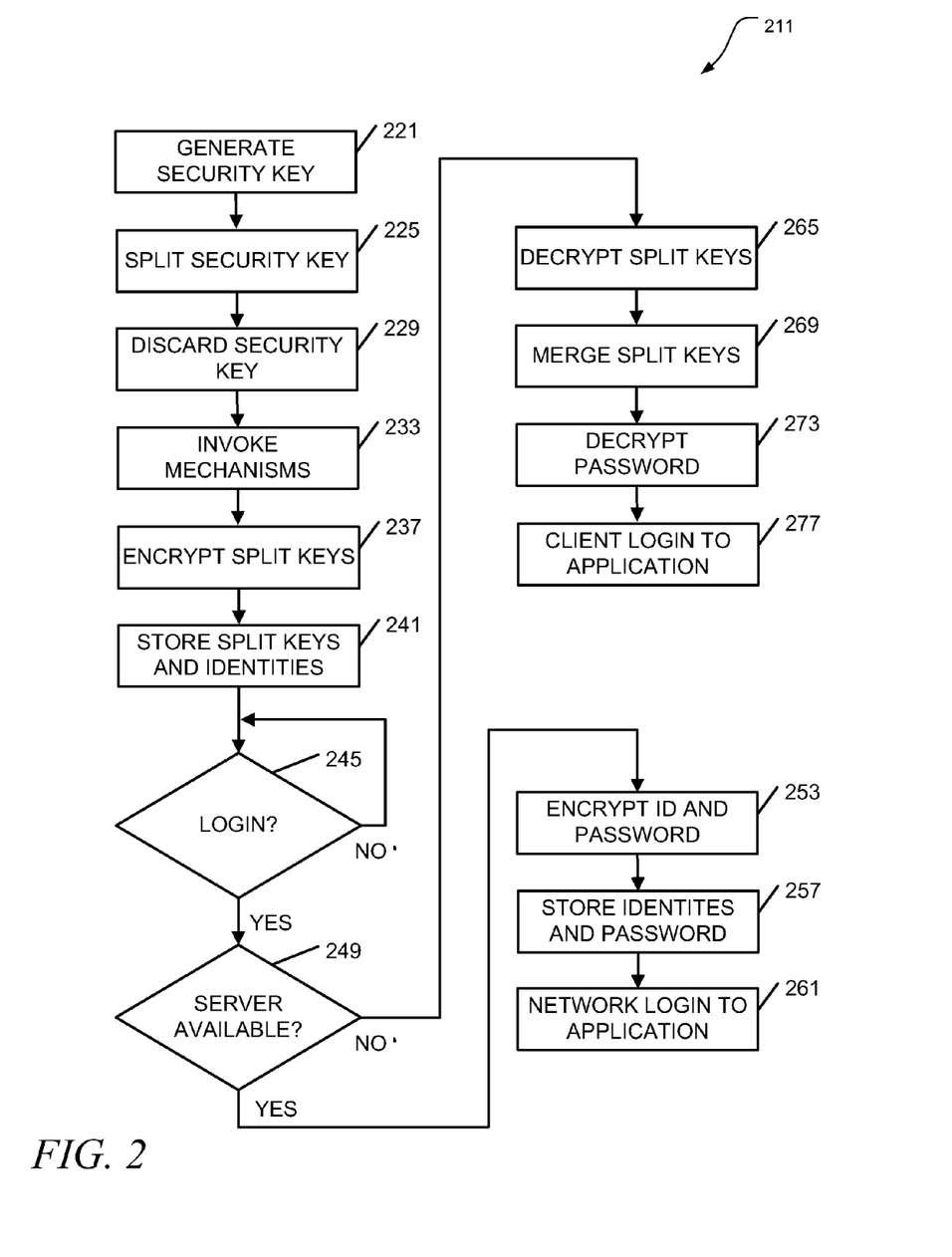
FIG. 2 is a flow diagram illustrating methods of client-based authentication according to various embodiments of the invention.

For example, FIG. 2 is a flow diagram illustrating methods 211 of client-based authentication according to various embodiments of the invention. The methods 211 are implemented in a machine-accessible and readable medium, and are operational over processes within and among networks. The networks may be wired, wireless, or a combination of wired and wireless. The methods 211 may be implemented as instructions, which when executed by a specific machine, operate to perform the processing depicted in FIG. 2.

Thus, a method 211 may begin at block 221 with generating an original security key K, which may be a randomly generated key. The method 211 may continue on to block 225 with splitting the security key into N split-keys Ki. The number N of split-keys Ki may correspond to N authentication mechanisms executable on a client node. In some embodiments, the client node operates to generate and/or split the security key K.

Once the original security key K is split, it can be discarded. Thus, the method 211 may include discarding the security key at block 229.

The method 211 may continue on to block 233 with invoking multiple authentication mechanisms, by the client node, to encrypt the N split-keys using credentials (e.g., network login credentials, including multi-factor credentials) associated with corresponding ones of the authentication mechanisms. This activity results in transforming the N split-keys Ki into N encrypted split-keys.

The number of authentication mechanisms may be less than, or equal to the number N of split-keys. Thus, when the number of authentication mechanisms is equal to the number N of split-keys, credentials from all of the authentication mechanisms can be used for encrypting and decrypting split-keys to enable local login, in the absence of access to a network authentication server. Therefore, in some embodiments, the number of authentication mechanisms can be less than or equal to the number N of split-keys. If some of the split-keys are reused, then the number of authentication mechanisms might be greater than the number N of split-keys.

As noted previously, credentials may include passwords, and these can be used to encrypt the split-keys after they are created. Thus, the method 211 may continue on to block 237 with encrypting each of the N split-keys using a password corresponding to one of the authentication mechanisms, for example, or an encrypted version of the password.

Each encrypted split-key, along with an associated local user identity and authentication mechanism identity, can be stored. Thus, the method 211 may continue on to block 241 with storing each of the encrypted split-keys with an associated local user identity (e.g., a user name used to login to the client node) and an identity (e.g., a name) of one of the corresponding authentication mechanisms, perhaps in a secure storage area. A registry, among other locations, may be used as the secure storage area The method 211 may continue on to block 245 to determine whether a login attempt that invokes authentication has been made. If not, then the method 211 may return to block 245 to wait for an indication of this type of login attempt to manifest itself. If such a login attempt is detected, then the method 211 may continue on to block 249.

If it is determined that an authentication node, such as a networked authentication server, is accessible at block 249, then the method 211 may continue on to block 253. In this case, when successful network login occurs, the local user identity and password can be encrypted using the original security key, and stored for future use. Thereafter, responsive to receiving an indication of a successful network login (e.g., at the client node) comprising acceptance of the credentials by corresponding authentication mechanisms, the method 211 may continue on to block 253 with encrypting the local user identity and a corresponding password with a reconstructed version of the security key to provide an encrypted identity and password, the reconstructed version of the security key generated from a combination of the N split-keys.

Once they are determined, a system user identity and the encrypted local user identity and password can be stored. Thus, the method 211 may continue on to block 257 with storing the system user identity, and the encrypted (local user) identity and password in a secure storage area. The system user identity may comprise a network user identity, such as a network user name. After storing these components, the method 211 may continue on to block 261, with presenting the user login interface to a network application.

When network login is not successful because the network authentication entity is not accessible, as determined at block 249, the split-keys can be decrypted by the client node, and used to reconstruct the original security key K.

Thus, the method 211 may continue on to block 265 from block 249, with decrypting the split-keys using the credentials at the client node, responsive to receiving an indication that a network login has been attempted and that an authentication server node is not accessible by the client node.

Once they are decrypted, the split-keys can be merged or otherwise combined to reconstruct the security key. Thus, the method 211 may continue on to block 269 with merging the split-keys to regenerate the security key as a reconstructed key (because in many embodiments, the security key has been discarded by the client node).

The reconstructed security key can be used to decrypt a system password associated with a system user identity, which may comprise a user name that enables login to the network for the identified user. Once the system password and system user identity are available in non-encrypted form, the user may be granted access to an application that executes on the client node. Thus, the method 211 may continue on to block 273 with decrypting an encrypted system password associated with a system user identity using a security key reconstructed from the split-keys. In this way, successful login to the client node is replicated, and access to one or more corresponding client applications is enabled at block 277, perhaps via presenting the user login interface to a client application.

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Thus, many other embodiments may be realized.

The methods shown in FIGS. 1 and 2 can be implemented in various devices, as well as in a computer-readable storage medium, where the methods are adapted to be executed by one or more processors. Further details of such embodiments will now be described.

Figure 3:
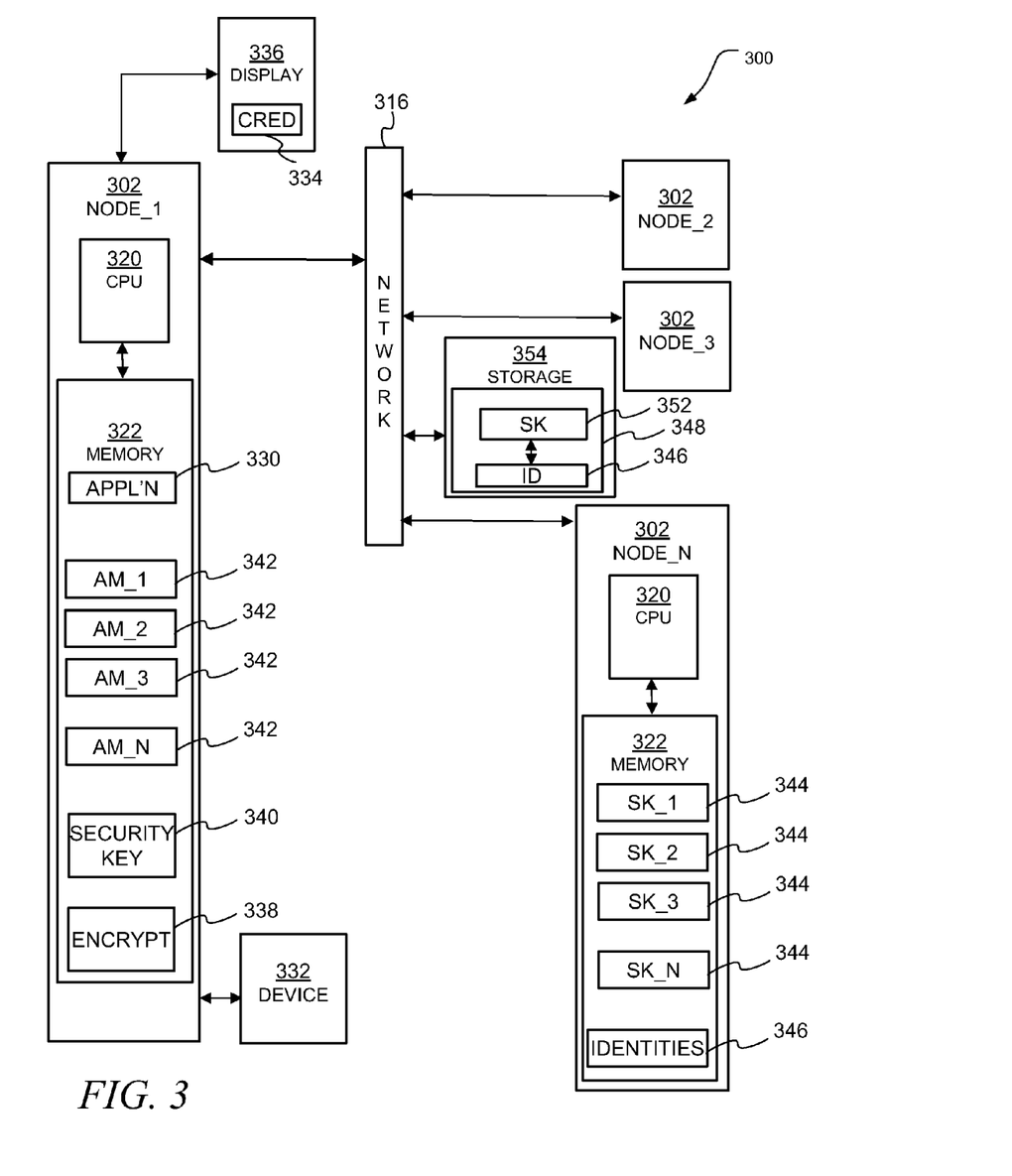
FIG. 3 is a block diagram of apparatus and systems according to various embodiments of the invention.

FIG. 3 is a block diagram of apparatus 300 and systems according to various embodiments of the invention. Here it can be seen that an apparatus 300 used to provide client-based authentication may comprise one or more processing nodes 302, one or more processors 320, multiple memories 322, and at least one display 342. The apparatus 300 may comprise a client, a server, or some other networked processing node.

The processing nodes 302 may comprise physical machines or virtual machines, or a mixture of both. The nodes 302 may also comprise networked entities, such as servers and/or clients. In some basic implementations, the operations described can occur entirely within a single node 302. The apparatus 300 may thus comprise a single desktop computer or server, for example, or a number of networked nodes 302.

In some embodiments, then, an apparatus 300 may comprise a secure storage area 348 in a storage device 354 coupled to a client node (e.g., NODE_1). The apparatus 300 may further comprise one or more processors 320 that can operate to invoke multiple authentication mechanisms 342 to encrypt N split-keys 344 using credentials 334 associated with corresponding ones of the authentication mechanisms 342. The result of this activity is to transform N split-keys 344 into N encrypted split-keys 352. The processor(s) 320 may then operate to store each of the encrypted split-keys 352 with an associated local user identity and the identity of one or more of corresponding ones of the authentication mechanisms (collectively, identities 346) in the secure storage area 348. After successful multi-factor authentication is accomplished, access to the client applications 330 may be granted.

The processing elements and the secure storage area may be constructed as a single unit, or separately. Thus, in some embodiments, the client node (e.g., NODE_1) may be housed together with the storage device 354. The storage device 354 may comprise volatile memory, non-volatile memory, or a combination of the two.

User credentials may be received in a variety of ways, including as biometric measurements. Thus, the apparatus 300 may further comprise one or more user input devices 332 to receive at least one of the credentials 334 as a biometric measurement.

User credentials may also be supplied by smart cards or cellular telephones. Thus, the apparatus 300 may further comprise one or more user input devices 332 to receive at least one one of the credentials 334 as data provided by a smart card or a cellular telephone.

The apparatus may include a separate encryption module to encrypt the split-keys, perhaps implementing any one of several common algorithms; e.g. Rivest, Shamir, and Adleman (RSA). Thus, the apparatus 300 may further comprise an encryption module 338 to encrypt the split-keys 344.

A system that operates to manage data access may comprise multiple instances of the apparatus 300. The system might also comprise a cluster of nodes 302, including physical and virtual nodes. It should be noted that any of the nodes 302 may include any one or more of the elements explicitly shown in nodes NODE_1, NODE_2, NODE_3, . . . , NODE_N, in any combination.

The nodes 302 may exist as a device embedded within another structure (e.g., as an embedded device), or as a regular desktop or laptop computer that includes a display 342 to show the activities conducted while the node 302 is active. Thus, the system may also comprise a display 342 coupled to the nodes 302 to display visible indications of the activities conducted (e.g., the entry of credentials 334) at the nodes 302.

The apparatus 300 and system may be implemented in a machine-accessible and readable medium that is operational over one or more networks 316. The networks 316 may be wired, wireless, or a combination of wired and wireless. The apparatus 300 and system can be used to implement, among other things, the processing associated with the methods of FIGS. 1 and 2, respectively. Modules may comprise hardware, software, and firmware, or any combination of these. Additional embodiments may be realized.

Figure 4:
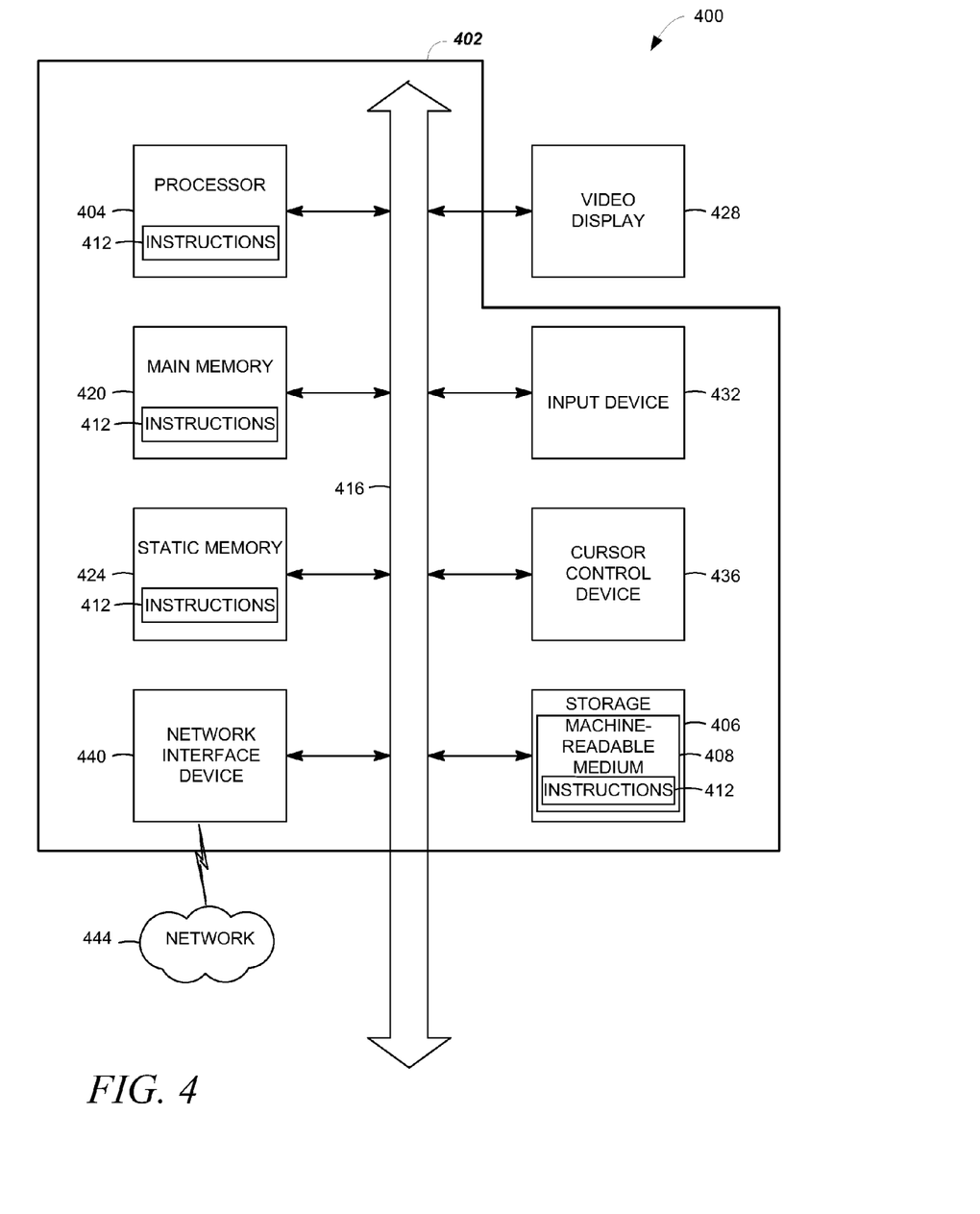
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C#. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a personal digital assistant (PDA), a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database), and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the various embodiments, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to provide new options for managing access to applications. For example, client-based, multi-factor authentication using network credentials can now be realized, even when no authentication server is accessible to the client. More efficient utilization of client applications, and increased user satisfaction may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:

a secure storage area in a storage device coupled to a client node; and one or more processing devices configured:

to invoke N multiple authentication mechanisms to encrypt N split-keys using credentials associated with corresponding ones of the N authentication mechanisms, to transform the split-keys into N encrypted split-keys, to store each of the encrypted split-keys, with an associated local user identity and an identity of one of the corresponding ones of the N authentication mechanisms in the secure storage area; and to decrypt an encrypted system password associated with a system user identity using a security key reconstructed from the split-keys to replicate successful login to the client node and to enable access to a client application.

2. The apparatus of claim 1, wherein the client node is housed together with the storage device.

3. The apparatus of claim 1, further comprising:
a user input device to receive at least one of the credentials as a biometric measurement.

4. The apparatus of claim 1, further comprising:
a user input device to receive at least one of the credentials as data provided by a smart card or a cellular telephone.

5. The apparatus of claim 1, wherein the storage device comprises non-volatile memory.

6. The apparatus of claim 1, further comprising:
an encryption module to encrypt the split-keys.

7. A processor-implemented method to execute on one or more processors that perform the method, comprising:
invoking N multiple authentication mechanisms, by a client node, to encrypt N split-keys using credentials associated with corresponding ones of the N authentication mechanisms, transforming the split-keys to provide N encrypted split-keys; and
storing each of the encrypted split-keys with an associated local user identity and an identity of one of the corresponding ones of the N authentication mechanisms; and
decrypting an encrypted system password associated with a system user identity using a security key reconstructed from the split-keys to replicate successful login to the client node and to enable access to a client application.

8. The method of claim 7, further comprising:
generating, by the client node, a security key that is to be split into the N split-keys.

9. The method of claim 7, further comprising:
responsive to receiving an indication that a network login has been attempted and that an authentication server node is not accessible by the client node, decrypting the split-keys using the credentials at the client node.

10. The method of claim 8, further comprising:
after the security key has been discarded by the client node, merging the split-keys to regenerate the security key as a reconstructed key.

11. The method of claim 7, further comprising:
splitting a security key into the N split-keys by the client node; and
encrypting each of the N split-keys using one of a password or an encrypted version of the password, the password corresponding to one of the N authentication mechanisms associated with one of the split-keys to be encrypted.

12. A processor-implemented method to execute on one or more processors that perform the method, comprising:
splitting, by a client node, a security key to provide N split-keys corresponding to N authentication mechanisms executable on the client node, and discarding the security key;
invoking the authentication mechanisms, by the client node, to encrypt the N split-keys using credentials associated with the N authentication mechanisms, transforming the split-keys to provide N encrypted split-keys; and
responsive to receiving an indication that a network login has been attempted at the client node and that an authentication server node is not accessible by the client node, decrypting, at the client node, the split-keys with the credentials associated with corresponding ones of the authentication mechanisms so that the security key can be reconstructed as a reconstructed key at the client node to replicate the network login.

13. The method of claim 12, further comprising:
storing each of the encrypted split-keys with an associated local user identity and an identity of one of the corresponding ones of the authentication mechanisms in a secure storage area.

14. The method of claim 13, wherein the secure storage area comprises a registry.

15. The method of claim 12, further comprising:
responsive to receiving, at the client node, an indication of a successful network login comprising acceptance of the credentials by the corresponding ones of the authentication mechanisms, encrypting the local user identity and a corresponding password with a reconstructed version of the security key to provide an encrypted identity and password, the reconstructed version of the security key generated from a combination of the N split-keys.

16. The method of claim 15, further comprising:
storing a system user identity and the encrypted identity and password in a secure storage area.

17. The method of claim 16 wherein the system user identity comprises a network user name.

18. The method of claim 12, wherein at least some of the authentication mechanisms are invoked to encrypt the N split-keys using random keys encrypted by password that form a portion of the credentials.

* * * * *

UNITED STATES PATENT AND TRADEMARK OFFICE
CERTIFICATE OF CORRECTION

PATENT NO. : 8,595,507 B2  
APPLICATION NO. : 13/028401  
DATED : November 26, 2013  
INVENTOR(S) : Panchapakesan et al.

Page 1 of 1

It is certified that error appears in the above-identified patent and that said Letters Patent is hereby corrected as shown below:

In the Claims

In column 8, line 62, in Claim 1, delete "split-keys," and insert --split-keys--, therefor In column 10, line 28, in Claim 14, delete "registry," and insert --registry.--, therefor In column 10, line 41, in Claim 17, after "16", insert --,--, therefor In column 10, line 45, in Claim 18, delete "password" and insert --passwords--, therefor Signed and Sealed this
Twenty-second Day of April, 2014

Michelle K. Lee
*Deputy Director of the United States Patent and Trademark Office*